(12) United States Patent
Qiu

(10) Patent No.: US 10,797,516 B2
(45) Date of Patent: Oct. 6, 2020

(54) LIGHTING SYSTEM INCLUDING A POWER BACKUP DEVICE

(71) Applicant: Lumileds LLC, San Jose, CA (US)

(72) Inventor: Yifeng Qiu, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/268,116

(22) Filed: Feb. 5, 2019

(65) Prior Publication Data

US 2019/0229552 A1 Jul. 25, 2019

Related U.S. Application Data

(63) Continuation of application No. 16/020,520, filed on Jun. 27, 2018, now Pat. No. 10,205,342, which is a
(Continued)

(30) Foreign Application Priority Data

Feb. 14, 2017 (EP) .................................. 17155961

(51) Int. Cl.
*H05B 45/37* (2020.01)
*H02J 9/06* (2006.01)
(Continued)

(52) U.S. Cl.
CPC .............. *H02J 9/065* (2013.01); *F21S 9/022* (2013.01); *H02J 7/00* (2013.01); *H02M 7/5395* (2013.01); *H05B 45/10* (2020.01); *H05B 45/37* (2020.01)

(58) Field of Classification Search
CPC ................ H05B 33/08; H05B 33/0809; H05B 33/0821; H05B 33/0842; H05B 33/0845;
(Continued)

(56) References Cited

U.S. PATENT DOCUMENTS

| 6,107,744 A | 8/2000 | Bavaro et al. |
| 8,022,682 B2 | 9/2011 | Honda et al. |

(Continued)

FOREIGN PATENT DOCUMENTS

| CN | 100426623 C | 10/2008 |
| CN | 101742783 A | 6/2010 |

(Continued)

OTHER PUBLICATIONS

"U.S. Appl. No. 15/730,386, Notice of Allowance dated Mar. 26, 2018", 9 pgs.

(Continued)

*Primary Examiner* — Jimmy T Vu
(74) *Attorney, Agent, or Firm* — Schwegman Lundberg & Woessner, P.A.

(57) ABSTRACT

A system may include a light source. A converter may be configured to convert an AC voltage to a DC operating voltage during normal operation. A power backup device may be coupled to the converter. A current source may have a first terminal configured to receive the DC operating voltage during regular operation and a second terminal configured to provide a pulse-width modulated (PWM) signal to an anode end of the light source. A switching device may have a first connecting terminal coupled to the anode end of the light source, a second connecting terminal coupled to the power backup device, and a control terminal coupled to the converter. The switching device may be configured to open a switch between the first connecting terminal and the second connecting terminal during normal operation and close the switch upon detecting an interruption of the DC operating voltage at the control terminal.

21 Claims, 5 Drawing Sheets

Related U.S. Application Data continuation of application No. 15/730,386, filed on Oct. 11, 2017, now Pat. No. 10,027,166.

(60) Provisional application No. 62/407,382, filed on Oct. 12, 2016, provisional application No. 62/426,085, filed on Nov. 23, 2016.

(51) Int. Cl.
*H02J 7/00* (2006.01)
*H05B 45/10* (2020.01)
*F21S 9/02* (2006.01)
*H02M 7/5395* (2006.01)

(58) Field of Classification Search
CPC ............... H05B 33/0881; H05B 37/02; H05B 37/0227; H05B 37/0272; H05B 45/00; H05B 45/10; H05B 45/37; H05B 47/00; H02J 9/065; H02J 7/00; F21S 9/022; H02M 7/5395
See application file for complete search history.

(56) References Cited

U.S. PATENT DOCUMENTS

| | | | |
|---|---|---|---|
| 8,022,683 B2 | 9/2011 | Thompson et al. | |
| 9,425,649 B2 | 8/2016 | Singer et al. | |
| 10,027,166 B2 | 7/2018 | Qiu | |
| 10,205,342 B2 | 2/2019 | Qiu | |
| 2005/0269882 A1 | 12/2005 | Kobayashi et al. | |
| 2011/0309758 A1 | 12/2011 | Yu et al. | |
| 2013/0127362 A1 | 5/2013 | Trainor et al. | |
| 2014/0097758 A1* | 4/2014 | Recker | H05B 37/0272 315/152 |
| 2014/0361623 A1* | 12/2014 | Siessegger | H05B 45/37 307/64 |
| 2017/0279300 A1 | 9/2017 | Catalano et al. | |
| 2018/0102672 A1 | 4/2018 | Qiu | |
| 2018/0316217 A1 | 11/2018 | Qiu | |

FOREIGN PATENT DOCUMENTS

| | | |
|---|---|---|
| CN | 104838727 A | 8/2015 |
| CN | 110168837 A | 8/2019 |
| JP | 2011175041 A | 9/2011 |
| JP | 2015003787 A | 1/2015 |
| JP | 2019530965 A | 10/2019 |
| KR | 20190067211 A | 6/2019 |
| TW | 201822431 A | 6/2018 |
| WO | WO-2018071631 A1 | 4/2018 |

OTHER PUBLICATIONS

"U.S. Appl. No. 16/020,520, Notice of Allowance dated Sep. 27, 2018", 8 pgs.
"U.S. Appl. No. 16/020,520, Preliminary Amendment filed Sep. 14, 2018", 3 pgs.
"Chinese Application Serial No. 201780076779.7, Office Action dated Jan. 13, 2020", W/ English Translation, 13 pgs.
"European Application Serial No. 17787297.5 and International Application Serial No. PCT/US2017/056281, Amendment filed May 3, 2019 in response to International Search Report dated Jan. 16, 2018", 14 pgs.
"European Application Serial No. 17787297.5, Intention to Grant dated Feb. 25, 2020", 60 pgs.
"European Application Serial No. 17787297.5, Office Action dated Dec. 12, 2019", 2 pgs.
"European Application Serial No. 17787297.5, Reply filed Dec. 18, 2019 to Office Action dated Dec. 12, 2019", 27 pgs.
"International Application Serial No. PCT/US2017/056281, International Preliminary Report on Patentability dated Apr. 25, 2019", 8 pgs.
"International Application Serial No. PCT/US2017/056281, International Search Report dated Jan. 16, 2018", 3 pgs.
"International Application Serial No. PCT/US2017/056281, Written Opinion dated Jan. 16, 2018", 6 pgs.
"Chinese Application Serial No. 201780076779.7, Office Action dated Jun. 9, 2020", w/ English Translation, 17 pgs.
"Japanese Application Serial No. 2019-519672, Notification of Reasons for Refusal dated Jun. 16, 2020", w/ English Translation, 9 pgs.

* cited by examiner

LIGHTING SYSTEM INCLUDING A POWER BACKUP DEVICE

CROSS REFERENCE TO RELATED APPLICATIONS

This application is a continuation of U.S. patent application Ser. No. 16/020,520, filed on Jun. 27, 2018, which is a continuation of U.S. patent application Ser. No. 15/730,386, filed Oct. 11, 2017, which issued as U.S. Pat. No. 10,027,166 on Jul. 17, 2018, which claims the benefit of U.S. Provisional Application No. 62/407,382, filed Oct. 12, 2016, U.S. Provisional Application No. 62/426,085, filed Nov. 23, 2016, and EP Patent Application No. 17155961.0, filed Feb. 14, 2017, which are incorporated by reference as if fully set forth.

BACKGROUND

Safety codes in many municipal jurisdictions often require the provision of sufficient and suitable lighting in buildings to ensure the reasonable safety of persons entering and exiting the buildings. This includes a requirement to provide emergency lighting to enable persons to escape from buildings when mains power is not available.

Emergency lighting systems commonly include a power backup device that is designated to provide backup power in the event of a mains power outage. Light fixtures in those systems are often wired to the power backup device and the power grid at the same in time. However, because a single power backup device can be used to power multiple light fixtures, some lighting systems include lengthy wire runs between their light fixtures and their power backup device. Having lengthy wire runs can be problematic in instances in which pulse-width modulated (PWM) signals are used to drive the light fixtures. In such instances, the wires can become a source of parasitic inductance, which can cause voltage spikes and ringing. Accordingly, the need exists for improved lighting system designs that avoid the generation of large amounts of parasitic inductance.

SUMMARY

A system may include a light source. A converter may be configured to convert an AC voltage to a DC operating voltage during normal operation. A power backup device may be coupled to the converter. A current source may have a first terminal configured to receive the DC operating voltage during regular operation and a second terminal configured to provide a pulse-width modulated (PWM) signal to an anode end of the light source. A switching device may have a first connecting terminal coupled to the anode end of the light source, a second connecting terminal coupled to the power backup device, and a control terminal coupled to the converter. The switching device may be configured to open a switch between the first connecting terminal and the second connecting terminal during normal operation and close the switch upon detecting an interruption of the DC operating voltage at the control terminal.

BRIEF DESCRIPTION OF THE DRAWINGS

The drawings described below are for illustration purposes only. The drawings are not intended to limit the scope of the present disclosure. Like reference characters shown in the figures designate the same parts in the various embodiments.

DETAILED DESCRIPTION

Figure 1:
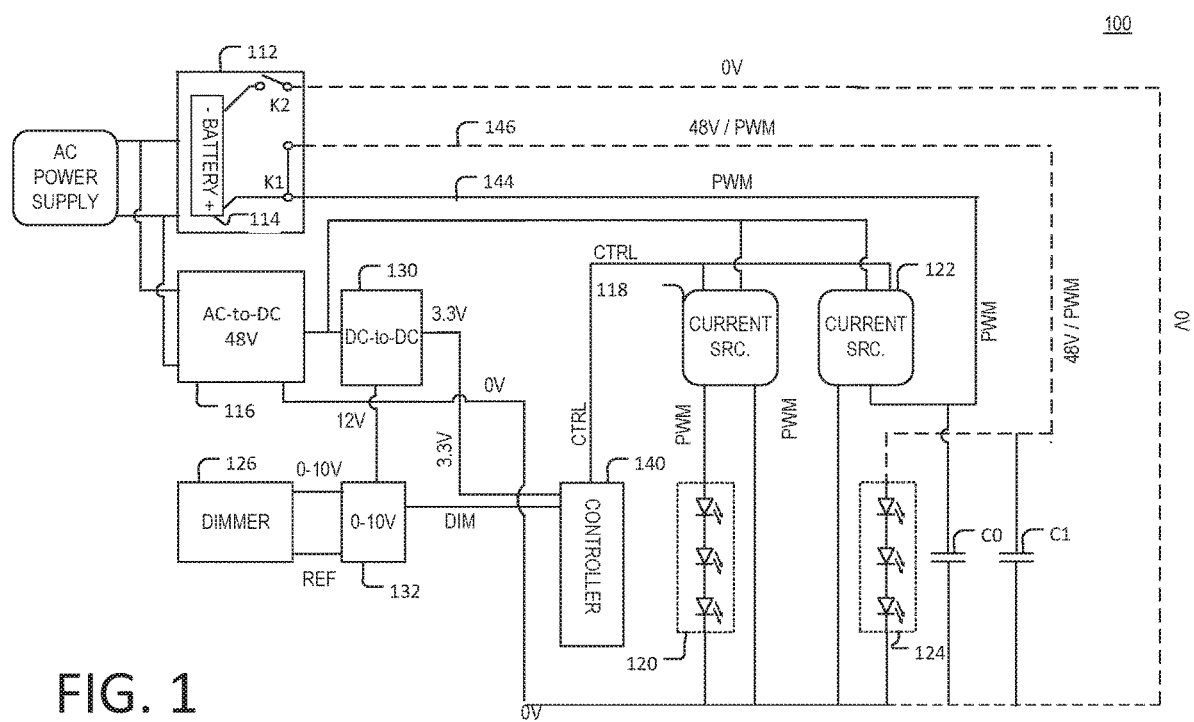
FIG. 1 is a circuit diagram of a lighting system, according to the prior art.

According to aspects of the disclosure, an improved lighting system is disclosed that generates reduced amounts of electromagnetic interference (EMI). The lighting system may include one or more light-emitting diodes (LEDs) which are powered using a pulse-width modulated (PWM) signal. The PWM signal has the potential to create large amounts of EMI when transmitted over long runs of cable. The improved lighting system, however, features a topology that reduces the amount of EMI that is generated by the transmission of PWM signals. In this topology, PWM signals are delivered to the LEDs via comparatively short runs of cable to reduce the amount of EMI produced by the lighting system.

Examples of implementations of the improved lighting system will be described more fully hereinafter with reference to the accompanying drawings. These examples are not mutually exclusive, and features found in one example can be combined with features found in one or more other examples to achieve additional implementations. Accordingly, it will be understood that the examples shown in the accompanying drawings are provided for illustrative purposes only, and they are not intended to limit the disclosure in any way. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that these terms are intended to encompass different orientations of the element in addition to any orientation depicted in the figures.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

FIG. 1 is a circuit diagram of a lighting system 100, in accordance with the prior art. The lighting system 100 includes a power backup device 112 and an AC-to-DC converter 116 which are both connected to an AC power supply. The AC power supply may include a municipal power grid, and/or any other suitable source of line voltage. The AC-to-DC converter 116 is configured to power both a light source 120 and a light source 124 when power from the AC power supply is available. The power backup device 112, on the other hand, is configured to power only the light source 124 when the supply of power to the AC-to-DC converter 116 is interrupted in the event of a failure of the AC power supply (e.g., a mains power outage, etc.).

The power backup device 112 may include a battery 114, a switch K1, and a switch K2. When power from the AC power supply is available, the switch K1 is configured to connect line 144 to line 146 in order to route power from the current source 122 to the light source 124. Furthermore, when power from the AC power supply is available, the switch K2 is configured to disconnect the negative terminal of the battery 144 from the return path of the light source 124. When the supply of power from the AC power supply is interrupted, the switch K1 is re-configured to disconnect the wire 144 from the wire 146. Furthermore, when the supply of power from the AC power supply is interrupted, the switch K2 is re-configured to connect the negative terminal of the battery 114 to the return path of the light source 124. Connecting the negative terminal of the battery to the light source 124 ensures that the light source 124 can remain operational while power from the AC power supply is unavailable. Stated succinctly, according to the arrangement shown in FIG. 1, the positive terminal of the battery 114 is connected to the current source 124 at all times, while the negative terminal of the battery 114 is connected to the return path of the light source 124 only when power from the AC power supply is not available.

The light source 120 may include one or more LEDs. Similarly, the light source 124 may also include one or more LEDs. The LEDs in the light source 120 may be configured to emit light having a first color temperature, and the LEDs in the light source 124 may be configured to emit light having a second color temperature that is different from the first color temperature. For example, the LEDs in the light source 120 may be configured to emit light having a color temperature of 3000K, and the LEDs in the light source 124 may be configured to emit light having a color temperature of 4000K.

The light source 120 may be driven by a current source 118 and the light source 124 may be driven by a current source 122. The current source 118 may be configured to generate a PWM signal based on a control signal CTRL received from a controller 140. The duty cycle of the PWM signal may depend on the control signal CTRL that is provided by the controller 140, and it may determine the brightness of the LEDs in the light source 120. The current source 122 may similarly be configured to generate a PWM signal based on the control signal CTRL. The duty cycle of the PWM signal generated by the current source 122 may also depend on the control signal CTRL that is provided by the controller 140, and it may determine the brightness of the LEDs in the light source 124. Stated succinctly, the controller 140 may use the control signal CTRL to adjust the brightness level of the light sources 120 and 124.

The controller 140 may include a processor (not shown) and a Bluetooth interface (not shown). The processor may be configured to generate the control signal CTRL (alone or in combination with other circuitry) based on a voltage signal DIM that is generated by the dimmer interface 132. The dimmer interface 132 may be configured to generate the reference voltage signal based on an input signal that is fed to the dimmer interface 132 by the dimmer controller 126. The dimmer controller 126 may include a slider switch or a knob, which can be physically manipulated by a user in order to set the brightness of the light sources 120 and 124.

The controller 140 and the dimmer interface 132 may be powered by the DC-to-DC converter 130. The DC-to-DC converter 130 may include a voltage regulator (not shown) that is operable to lower the 48V DC signal provided by the AC-to-DC converter 116 to 12V and subsequently feed the 12V signal to the dimmer interface. Furthermore, the DC-to-DC converter may include a linear regulator (not shown) that is operable to further reduce the 12V DC signal provided by the voltage regulator to 3.3V DC and subsequently feed the 3.3V signal to the controller 140.

The PWM signal that is used to power the light source 124 is routed through the power backup device 112 via the lines 144 and 146. This permits the power backup device 112 to control whether the battery 114 or the AC-to-DC converter 116 supplies the power to the LEDs, which in turn eliminates the possibility of double-driving the light source 124 when there is a power fluctuation. It further permits the execution of testing sequences for testing the operational readiness of the lighting system 100 in the event of a power outage.

According to the design of the lighting system 100, the PWM signal output from the current source 122 is routed through the lines 144 and 146 before it reaches the light source 124. The lines 144 and 146 (e.g., wires, cables, power rails, etc.) can be over a meter long and they can reach up to 15 meters each in some products that are available on the market. Having lines this long may be necessitated, for example, by the power backup device 112 being located far away from the light source 124 or a need for the power backup device 112 to power multiple light fixtures that are some distance apart from one another.

During normal operation, when power from the AC power supply is available, the PWM signal (e.g., a 1 kHz PWM signal) generated by the current source 122 for the light source 124 is routed through the power backup device 112 via the switch K1 which connects the lines 144 and 146 to one another. The long wires 144/146 conducting the PWM signal (current) through the power backup device 112 may introduce parasitic inductances. As can be readily appreciated, currents at the PWM frequency, having rise and fall times on the order of 1 microsecond, can cause significant EMI. The corner frequency of the resulting EMI signal may be on the order of 300 kHz. In some aspects, the use of large capacitors C0 and C1 somewhat reduces the EMI, but also reduces the sharpness of the PWM pulses, which affects the accuracy of the brightness and color control. Further, even if the capacitors C0 and C1 were not used, the parasitic capacitances and inductances on the lines 144 and 146, which as noted above could be up to 15 m long, could also cause inconsistent performance due to PWM currents flowing through them.

Figure 2:
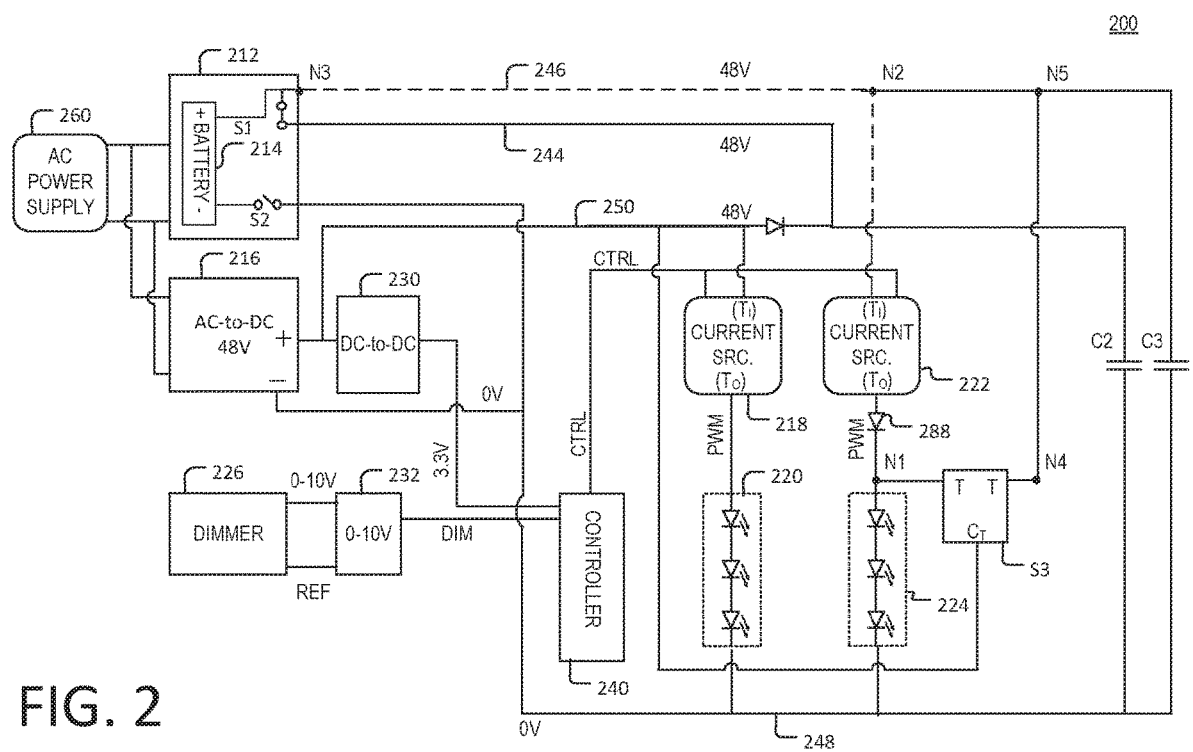
FIG. 2 is a circuit diagram of a lighting system, according to aspects of the disclosure.

FIG. 2 is a circuit diagram of a lighting system 200, according to aspects of the disclosure. The lighting system 200 includes a power backup device 212 and an AC-to-DC converter 216 which are both connected to an AC power supply 260. The AC power supply 260 may include a municipal power grid, and/or any other suitable source of line voltage. The AC-to-DC converter 216 may be configured to power both a light source 220 and a light source 224 when power from the AC power supply 260 is available. The power backup device 212, on the other hand, may be configured to power only the light source 224 when the AC-to-DC converter 216 is switched off as a result of the supply of power from the AC power supply 260 being interrupted.

The power backup device 212 may include a battery 214, and switches S1 and S2. Each of switches S1 and S2 may include a spring-loaded relay switch and/or any other suitable type of switching device. In some implementations, the power backup device 212 may further include current-sensing circuitry (not shown) that is arranged to detect when the supply of power from the AC power supply 260 is interrupted. In some implementations, the current-sensing circuitry of the power backup device 212 may be configured to open the switch S1 and close the switch S2 in response to detecting that the supply of power from the AC power supply 260 is interrupted. The current-sensing circuitry of the power backup device 112 may also detect when the supply of power from the AC power supply 260 is resumed and, in response, open the switch S2 while concurrently closing the switch S1. Accordingly, in some implementations, the current sensing circuitry may at least in part transition the power backup device 212 between two different states by reconfiguring the switches S1 and S2 based on whether power from the AC power supply 260 is available.

More specifically, when a supply of power from the AC power supply 260 is available, switch S1 may be configured by the current-sensing circuitry of the power backup device 212 to connect line 244 to line 246, thus causing the positive terminal of the AC-to-DC converter 216 to be connected to the input terminal $T_I$ of the current source 222. At the same time, the switch S2 may be configured by the current-sensing circuitry of the power backup device 212 to maintain an open circuit between the negative terminal of the battery 214 and the return path 248 of the light source 224. In some implementations, the lines 244 and 246 (e.g., wires, cables, power rails, etc.) may be substantially longer than the lines spanning from the output terminals $T_O$ of the current sources 118 and 222 to the anodes of the light sources 220 and 224. Specifically, in some implementations, the lines 244 and 246 may be between 1 m and 15 m long. As is further discussed below, in system 200, no PWM signals are carried over the lines 244 and 246 which reduces the amount of EMI that is produced by the system 200 (in comparison to the system 100).

Furthermore, when a supply of power from the AC power supply 260 is interrupted, switch S1 may be configured by the current-sensing circuitry of the power backup device 212 to disconnect line 244 from line 246, thus causing the positive terminal of the AC-to-DC converter to be disconnected to the input terminal $T_I$ of the current source 222. At the same time, the switch S2 may be configured by the current-sensing circuitry of the power backup device 212 to close the circuit between the negative terminal of the battery 214 and the return path 248 of the light source 224.

As illustrated in FIG. 2, the positive terminal of the battery 214 may be connected at all times to the input terminal $T_I$ of the current source 222. Furthermore, the negative terminal of the battery 214 may be connected to the return path 248 of the light source 224 only when the supply of power from the AC power supply 260 is interrupted. However, alternative implementations are possible in which the negative terminal of the battery is always connected to the return path 248 while another switching device, is used to connect line 246 to one of line 244 and the positive terminal of the battery 214.

The light source 220 may include one or more LEDs. The LEDs in the light source 220 may be disposed in the same light fixture or in a plurality of light fixtures that are some distance apart from one another. Similarly, the light source 224 may also include one or more LEDs. The LEDs in the light source 224 may also be disposed in the same a light fixture or in a plurality of light fixtures that are some distance apart from one another. According to aspects of the disclosure, the LEDs in the light source 220 may be configured to emit light having a first color temperature, and the LEDs in the light source 224 may be configured to emit light having a second color temperature that is different from the first color temperature. For example, the LEDs in the light source 220 may be configured to emit light having color temperature of 3000K and the LEDs in the light source 224 may be configured to emit light having a color temperature of 4000K.

The light source 220 may be driven by a current source 218 and the light source 224 may be driven by a current source 222. The current source 218 may be configured to generate a PWM signal for driving the light source 220 based on a control signal CTRL received from a controller 240. The duty cycle of the PWM signal may depend on the control signal CTRL, and it may determine the brightness of the LEDs in the light source 220. The current source 222 may be similarly configured to generate a PWM signal for driving the light source 224 based on the control signal CTRL. The duty cycle of the PWM signal generated by the current source 222 may also depend on the control signal CTRL that is provided by the controller 240 and determine the brightness of the one or more LEDs in the light source 224. Stated succinctly, the control signal CTRL provided by the controller 240 may set the brightness level of the light sources 220 and 224.

The switching device S3 and the current source 222 may be coupled in parallel to the light source 224 and the power backup device 212. The current source 222 may be arranged on a first electrical path between the power backup device 212 and the light source 224 and the switching device S3 may be arranged on a second electrical path between the power backup device 212 and the light source 224. The first electrical path may span nodes N1, N2, and N3. And the second electrical path may span nodes N1, N4, N5, N2, and N3. In some implementations, the difference between the first electrical path and the second electrical path may be in that the first electrical path does not extend: (1) between nodes N1 and N4 and (2) between nodes N4 and N5, while the second electrical path does not extend (3) between nodes N1 and N2.

The switching device S3 may include a control terminal $C_T$ and two connect-terminals T. The switching device S3 may be configured to selectively connect and disconnect the connect-terminals T from one another based on the value of a signal that is applied at the control terminal $C_T$. When a first signal is applied at the control terminal $C_T$ (e.g., 48V), the switching device S3 may open an electrical path between the connect-terminals T. In such instances, no current may flow between the connect-terminals (across the switching device S3) and the switching device S3 is said to be in an open state. When a second signal is applied at the control terminal $C_T$ (e.g., 0V), the switching device S3 may close the electrical path between the connect terminals T. In such instances, current may flow across the switching device S3, between the connect-terminals T, and the switching device S3 is said to be in a closed state.

In the present example, one of the connect-terminals is coupled to the battery 214 and the other-connect terminal is coupled to the anode end of the light source 224. When a first signal is applied on the control terminal $C_T$ (e.g., 48V), the switching device S3 may maintain an electrical path between the two connect-terminals T open. When a second signal is applied on the control terminal $C_T$ (e.g., 0V), the switching device S3 may close the electrical path between the two connect-terminals T. In some implementations, a diode 288 may be provided at the output terminal $T_O$ of the current source 222 to prevent the backflow of current. The capacitors C2 and C2 may be coupled to the lines 246 and 250 to filter out some types of noise, such as switching noise generated by the switching device S3.

The switching device S3 may include any suitable type of switching device. In some implementations, the switching device S3 may include a PMOS transistor. In such instances, the control terminal $C_T$ of the switching device S3 may be the gate of the PMOS transistor. Furthermore, in instances in which the switching device S3 includes a PMOS transistor, the gate of the PMOS transistor may be coupled to a simple Vgs limiting circuit, such as a Zener diode, to limit the voltage at the gate. The Vgs limit may be on the order of 20V.

The controller 240 may include a processor (not shown) and a communications interface (not shown), such as a Bluetooth interface. The processor may include one or more of a general-purpose processor, an application-specific integrated circuit (ASIC), a Field-Programmable Gate Array (FPGA), and or any other suitable type of processing circuitry. The processor may be configured to generate the control signal CTRL (alone or in combination with other circuitry) based on a reference voltage signal DIM that is generated by the dimmer interface 232. The dimmer interface 232 may be configured to generate the reference voltage signal based on an input signal that is fed to the dimmer interface 232 by the dimmer controller 226. In some implementations, the dimmer controller 226 may include a slider, a switch, a knob, and/or another similar device that can be physically manipulated by a user to change the brightness of the light sources 220 and 224. The controller 240 may be powered by a DC-to-DC converter 230, which may be operable to further reduce the 48V DC signal output by the AC-to-DC converter to 3.3V DC.

When power from the AC power supply 260 is available, the switch S1 may be maintained in a closed state by the current-sensing circuitry of the power backup device 212, and the switch S2 may be maintained in an open state by the current-sensing circuitry of the power backup device 212. Concurrently, a 48V DC signal (e.g., DC operational voltage) may be generated by the AC-to-DC converter 216 and routed through the switch S1 of the power backup device 212 and into the current source 222. A PWM signal may be generated by the current source 222 based on the 48V DC signal (e.g., DC operational voltage) and used to power the light source 224. Because no PWM signal is carried over the lines 244 and 246 that connect the current source 222 to the power backup device 212, the amount of EMI generated by the lighting system 200 is greatly reduced. This is partly due to the fact that the lines 244 and 246 may be much longer than the lines connecting the output terminals of the current sources to the light sources. Furthermore, this is in contrast to the lighting system 100, in which the wires that connect the current source 122 to the power backup device 112 carry PWM signals, which in turn causes increased amounts of EMI. It will be recalled that connecting the current source(s) 122/222 to the respective power backup devices 112/126 may be necessary for various practical reasons, such as ensuring that no LEDs are double-driven and/or performing testing sequences.

Furthermore, when current from the AC power supply 260 is available, a 48V DC signal (e.g., DC operational voltage) may be applied at the control terminal $C_T$ of the switching device S3 by the AC-to-DC converter 216, which may cause the switching device S3 to remain in the open state.

When the supply of power from the AC power supply 260 is interrupted, the controller 240 may be switched off as a result of having its power supply cut off. When the controller 240 is switched off, it may no longer supply the control signal CTRL to the current source 222, which in turn may cause the current source 222 to become disabled. When the current source 222 is disabled, the electrical path between the input terminal $T_I$ and the output terminal $T_O$ of the current source 222 is interrupted and no current can flow across the current source 222 from the power backup device 212 to the light source 224.

Furthermore, when the supply of current from the AC power supply 260 is interrupted, the current-detecting circuit (not shown) of the power backup device 212 may detect the interruption. In response, the current-detecting circuit (not shown) of the power backup device 212 may reconfigure (e.g., open) switch S1 to disconnect line 244 from line 246, thus leaving line 246 connected only to the positive terminal of the battery 214. Furthermore, in response to detecting that the supply of power from the AC power supply 260 has been interrupted, the current-detecting circuit of the power backup device 212 may reconfigure (e.g., close) the switch S2 to connect the return path of the light source 224 to the negative terminal of the battery 214. Concurrently, when the supply of power from the AC power supply 260 has been interrupted, the signal applied at the control terminal $C_T$ of the switching device S3 by the AC-to-DC converter 216 may change to a logic low value (e.g., 0V), which in turn may cause the switching device S3 to transition into the closed state, thus connecting the positive terminal of the battery 214 to the light source 224. As a result of the reconfiguration of the switches S1, S2, and S3, the light source 224 may begin receiving power from the power backup device S3 and remain operational in the event of a failure of the AC power supply 260 (e.g., in the event of a mains power outage).

Figure 3:
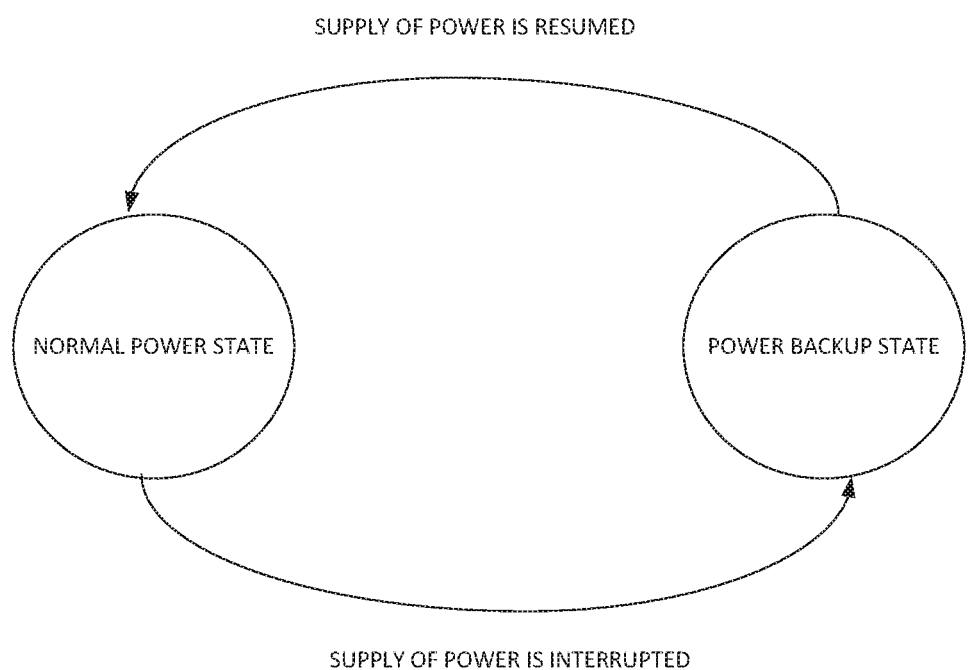
FIG. 3 is a state diagram illustrating the operation of the lighting system of FIG. 2, according to aspects of the disclosure.

FIG. 3 is a state diagram illustrating the operation of the lighting system 200, according to aspects of the disclosure. FIG. 3 shows that during its operation, the system 200 may cycle between at least two operational states, termed "normal power state" and "backup power state."

When the system 200 is in the normal power state, the light sources 220 and 224 are both powered by the AC-to-DC converter 216. More particularly, when the system 200 is in the normal power state, a supply of AC voltage from the AC power supply 260 is available to the AC-to-DC converter 216, which converts the AC voltage to a 48V DC operational voltage. As discussed above, the 48V DC operational voltage may be used to drive various components of the system 200, such as the controller 240, and the current sources 218 and 222. When the system 200 is in the normal power state, the lines 244 and 246 may be connected to one another by the switch S1, while the negative terminal of the battery 214 may be disconnected from the light source 224 by the switch S2. Furthermore, the switching device S3 may be in the open state as a result of having the operational DC voltage applied by the AC-to-DC converter 216 at the switching device's S3 control terminal $C_T$.

When the system 200 is in the backup power state, the light source 220 is switched off, while the light source 224 is powered by the power backup device 212. More particularly, when the system 200 is in the backup power state, the supply of AC voltage from the AC power supply 260 is interrupted. As a result, the AC-to-DC converter 216 may stop outputting the 48V DC operational voltage, causing the controller 240 to become switched off. When the controller 240 is switched off, the control signal CTRL stops being supplied to the current source 222 by the controller 240. When the control signal CTRL is not supplied to the current source 222, the electrical path between the input and output terminals of the current source 222 is interrupted such that no current from the power backup device 212 can flow across the current source 222. Furthermore, line 244 is disconnected from line 246 by the switch S1, while the negative terminal of the battery 214 is connected to the return path 248 of the light source 224 by the switch S2. Furthermore, in the backup power state, the switching device S3 is transitioned into the closed state (as a result of a the 48V DC operational voltage no longer being applied at the control terminal $C_T$ by the AC-to-DC converter 216), which permits current from the battery 214 to flow across the switching device S3 and into the light source 224.

The system 200 may exit the normal power state and transition into the backup power state when the current sensing circuit in the power backup device 212 detects that the supply of power from the AC power supply 260 has been interrupted, causing the AC-to-DC converter 216 to lose its supply of AC voltage and stop receiving any power. The system 200 may exit the backup power state and transition into the normal power state, when the current sensing circuit in the power backup device 212 detects that the supply of power from the AC power supply 260 has been resumed, causing the supply of AC voltage to the AC-to-DC converter 216 to be available.

Figure 4:
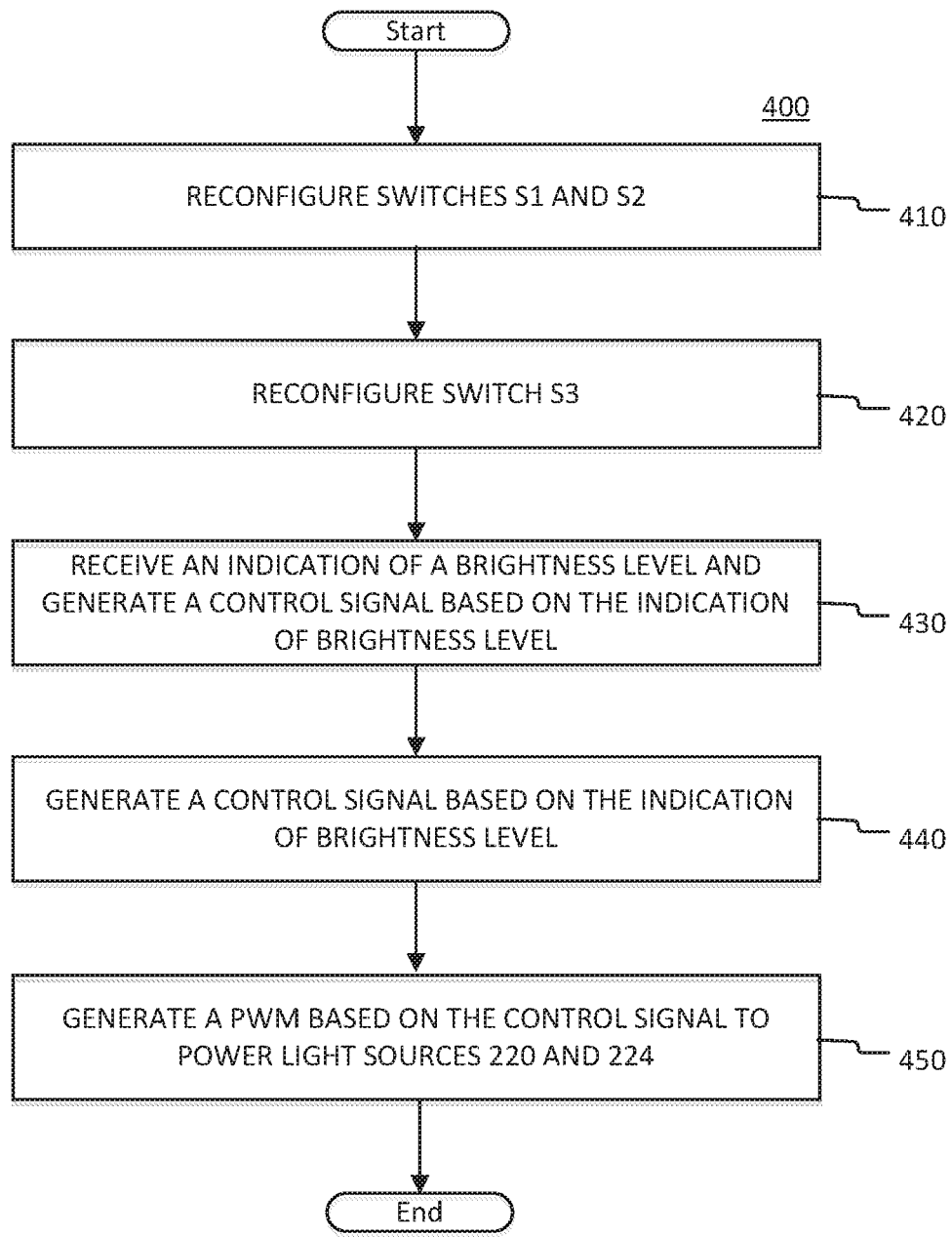
FIG. 4 is a flowchart of an example of a process performed by the lighting system of FIG. 2 when the lighting system of FIG. 2 is in a first state, according to aspects of the disclosure.

FIG. 4 is a flowchart of an example of a process 400 that is performed by the system 200 when the system 200 is in the normal power state. At step 410, switch S1 is configured to connect lines 244 and 246 to one another, and the switch S2 is configured to disconnect the negative terminal of the battery 214 from the return path 248 of the light source 224. At step 420, the switching device S3 is transitioned into the open state as a result of a 48V signal being applied by the AC-to-DC converter 216 at the control terminal $C_T$ of the switching device S3. At step 430, an indication of a brightness level is received by the controller 240. In some implementations, the indication may be a voltage signal that is generated by the dimmer controller 226 and the dimmer interface 232 or a message that is received via a communications interface of the controller 240 (e.g., a Bluetooth interface) that specifies a selected brightness level. At step 440, the control signal CTRL is output by the controller to the current sources 218 and 222 based on the received indication. At step 450, the current sources 218 and 222 begin outputting respective PWM signals that are used to drive the light sources 220 and 224, respectively. As noted above, the PWM signals may each have a duty cycle that depends on the control signal CTRL.

Figure 5:
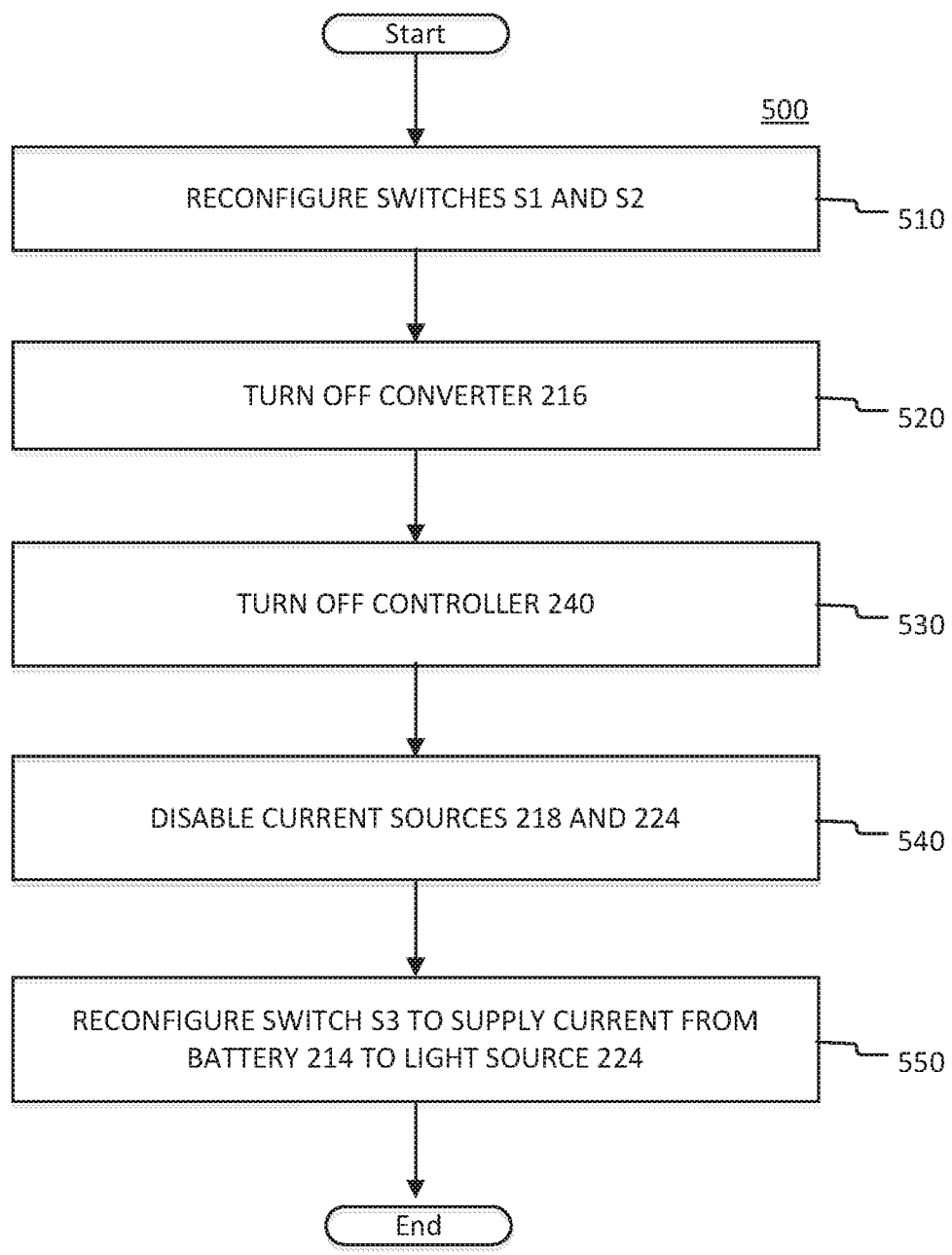
FIG. 5 is a flowchart of an example of a process performed by the lighting system of FIG. 2 when the lighting system of FIG. 2 is in a second state, according to aspects of the disclosure.

FIG. 5 is a flowchart of an example of a process 500 that is performed by the system 200 when the system 200 is in the backup power state. At step 510, switch S1 is configured to disconnect lines 244 and 246 from one another, and switch S2 is configured to connect the negative terminal to the battery 214 to the return path 248 of the light source 224. At step 520, the AC-to-DC converter 216 stops outputting a 48V DC signal as a result of losing its AC voltage supply (e.g., due to a municipal power grid failure, etc.). At step 530, the controller 240 is switched off as a result of losing its supply of power from the AC-to-DC converter 216. When the controller is switched off, the control signal CTRL stops being supplied to the current sources 218 and 222. At step 540, the current sources 218 and 222 are disabled due to the loss of the control signal CTRL and they stop supplying respective PWM signals to the light sources 220 and 224. At step 550, the switching device S3 is transitioned into the closed state (e.g., as a result of the 48V DC operational voltage no longer being applied at the control terminal $C_T$), which causes current to begin flowing from the battery 214 to the light source 224.

FIGS. 1-5 are provided as an example only. At least some detail may be omitted from the figures in order to improve clarity. Furthermore, at least some of the steps in the processes 400 and 500 can be omitted, performed concurrently, or performed in a different order. The present disclosure is not limited to any particular order of performing the steps in the processes 400 and 500, and some or most of these steps can be performed concurrently. Although the disclosure is provided in the context of light-emitting diodes, it will be understood that the system 200 is not limited to using light emitting diodes as light sources. As used throughout the disclosure, the phrase "supply of power is interrupted" may refer to circumstances in which power is no longer supplied without implying anything about the duration of the interruption. For example, the interruption may last for any suitable time period, such as minutes, hours, days, etc. As used throughout the disclosure, the phrase "supply of AC voltage is interrupted" may refer to circumstances in which AC voltage is no longer supplied without implying anything about the duration of the interruption. For example, the interruption may last for any suitable time period, such as minutes, hours, days, etc. At least some of the elements discussed with respect to these figures can be arranged in different order, combined, and/or altogether omitted. It will be understood that the provision of the examples described herein, as well as clauses phrased as "such as," "e.g.", "including", "in some aspects," "in some implementations," and the like should not be interpreted as limiting the disclosed subject matter to the specific examples.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. A light-emitting diode (LED) lighting system comprising:
   a first input terminal configured for electrical coupling with a backup power source;
   a second input terminal and a third input terminal configured for electrical coupling with a main power source;
   a first plurality of LEDs;
   a first current source electrically coupled to the first plurality of LEDs and configured to provide a first pulse-width modulated (PWM) signal to the first plurality of LEDs;
   a controller electrically coupled between the third input terminal and the current source and configured to provide a control signal to operate the first current source in a normal power mode and disable the first current source in a backup power mode; and a switch arranged on an electrical path between the first plurality of LEDs and the first input terminal and configured to open the electrical path in the normal power mode and to close the electrical path to supply current from the first input terminal directly to the first plurality of LEDs in the backup power mode.

2. The lighting system of claim 1, wherein the controller is further configured to disable the first current source on a condition that the third input terminal is at or below a threshold and to operate the first current source on a condition that the voltage level at the third input terminal is above the threshold.

3. The system of claim 1, wherein the switch is further configured to open the electrical path on a condition that a voltage level at the second input terminal is above a threshold and to close the electrical path on a condition that the voltage level at the second input terminal is at or below the threshold.

4. The system of claim 1, wherein the electrical path comprises a first power line electrically coupled to the first input terminal, and the system further comprises a second power line electrically coupled to the second input terminal.

5. The system of claim 4, wherein the switch comprises:
a first contact terminal electrically coupled between the first current source and the first plurality of LEDs,
a second contact terminal electrically coupled to the first power line; and
a control terminal electrically coupled to the second power line.

6. The system of claim 1, further comprising a second plurality of LEDs electrically coupled to a second current source, the second current source configured to provide a second PWM signal to the second plurality of LEDs.

7. The system of claim 4, wherein the first plurality of LEDs is configured to emit light having a first correlated temperature (CCT) when powered on and the second plurality of LEDs is configured to emit light having a second CCT different from the first CCT when powered on.

8. The system of claim 7, wherein the second current source is electrically coupled to the second power line and not electrically coupled to the switch.

9. A method of operating a light-emitting diode (LED) lighting system, the method comprising:
providing direct current (DC) power to a first current source to provide a pulse width modulated (PWM) drive signal to a first plurality of LEDs; and
on a condition that a voltage level of the DC power drops to or below a threshold:
turning off the first current source, and
activating a path to provide a backup DC current from a power backup device to the first plurality of LEDs by deactivating a first switch to open a connection to supply the DC power to the first current source and activating a second switch to close a connection outside the power backup device to supply the backup DC current to the first plurality of LEDs.

10. The method of claim 9, further comprising:
providing the DC power to a second current source to provide another PWM drive signal to a second plurality of LEDs; and
not providing the backup DC current to the second plurality LEDs on a condition that a voltage level of the first DC power drops to or below the threshold.

11. The method of claim 10, further comprising:
receiving a voltage from a dimmer actuator;
supplying a dimming reference voltage to a controller based on the voltage received from the dimmer actuator; and
the controller controlling the first and second current sources to operate at respective brightness levels based on the dimming reference voltage.

12. The method of claim 9, further comprising:
activating the path to provide the backup DC current from the power backup device to the first plurality of LEDs by further adjusting a third switch in the power backup device to open a connection to supply the DC power to the first current source and close a connection to supply the backup DC current to the first plurality of LEDs.

13. A light-emitting diode (LED) lighting system comprising:
a first input terminal electrically coupled to a first power line and configured for electrical coupling with a backup power source;
a second input terminal configured for electrical coupling with an external direct current (DC) power supply;
a first plurality of LEDs;
a second plurality of LEDs;
a first current source electrically coupled to the first plurality of LEDs; and
a switch electrically coupled in parallel with an anode end of the first plurality of LEDs and the first power line and configured to electrically couple the anode end of the first plurality of LEDs to the first input terminal on a condition that a voltage at the second input terminal drops below a threshold.

14. The system of claim 13, wherein the switch comprises a first contact terminal electrically coupled between the first current source and the first plurality of LEDs and a second contact terminal electrically coupled to the first power line, the switch configured to electrically couple the first plurality of LEDs to the first power line on a condition that the voltage level at the first input terminal drops to or below the threshold.

15. The system of claim 14, wherein the switch further comprises a control terminal, and the system further comprises a second power line electrically coupled between the second input terminal and the control terminal and electrically coupled to the first current source.

16. The system of claim 15, wherein the switch is configured to electrically couple the first plurality of LEDs to the first power line on a condition that a voltage level on the second power line drops below a threshold voltage at the control terminal.

17. The system of claim 16, wherein the switch is further configured to decouple the first plurality of LEDs from the first power line on a condition that a voltage level on the second power line drops below a threshold voltage at the control terminal.

18. The system of claim 15, further comprising a third input terminal electrically coupled to a third power line and configured for electrical coupling with the backup power source, the third power line being electrically coupled to the second power line.

19. The system of claim 18, further comprising:
fourth and fifth input terminals configured for electrical coupling with an external dimmer actuator;
a dimmer interface electrically coupled to the fourth and fifth input terminals; and
a controller electrically coupled between the dimmer interface and the first current source.

20. The system of claim 19, further comprising a second current source electrically coupled to provide a second PWM signal to the second plurality of LEDs, the second current source being electrically coupled to the third power line and not electrically coupled to either of the first and second contact terminals of the switch.

21. The system of claim 13, further comprising a diode between the first current source and the first plurality of LEDs.

* * * * *